United States Patent [19]
Fisher

[11] 4,333,546
[45] Jun. 8, 1982

[54] ESCAPE SLIDE

[75] Inventor: John M. Fisher, Cuyahoga Falls, Ohio

[73] Assignee: The B. F. Goodrich Company, Akron, Ohio

[21] Appl. No.: 122,216

[22] Filed: Feb. 19, 1980

[51] Int. Cl.³ .................... A62B 1/20; B64D 25/14
[52] U.S. Cl. ................................ 182/48; 193/25 B
[58] Field of Search .............. 182/48, 49; 193/25 B; 244/137 P; 52/2

[56] References Cited

U.S. PATENT DOCUMENTS

| | | | |
|---|---|---|---|
| 3,476,338 | 11/1969 | Fisher | 14/69.5 |
| 3,656,579 | 4/1972 | Fisher | 182/48 |
| 3,692,144 | 9/1972 | Summer | 182/48 |
| 3,845,920 | 11/1974 | Satterfield | 182/48 |
| 3,973,645 | 8/1976 | Dix | 182/48 |
| 4,018,321 | 4/1977 | Fisher | 182/48 |

*Primary Examiner*—Reinaldo P. Machado
*Attorney, Agent, or Firm*—Harry F. Pepper, Jr.

[57] ABSTRACT

An escape slide for evacuating personnel from an aircraft wing or other elevated surface where persons to be evacuated must walk a short distance before sliding down the slide. The escape slide has an entrance portion with a walkway and a walkway ramp of an inflatable bulkhead construction providing a firm walkway surface. The slide portion joins the entrance portion and is inclined toward the ground. When used on an aircraft wing with flaps, the bottom of the slide portion is engageable with and supported by the flaps at different operating positions. A support pillow attached to the bottom of the slide portion is engageable with the flap in the fully extended landing position. Inflatable indicator tubes are also attached to and in communication with the inflatable members of the slide to indicate when the slide is inflated and ready for passengers.

8 Claims, 5 Drawing Figures

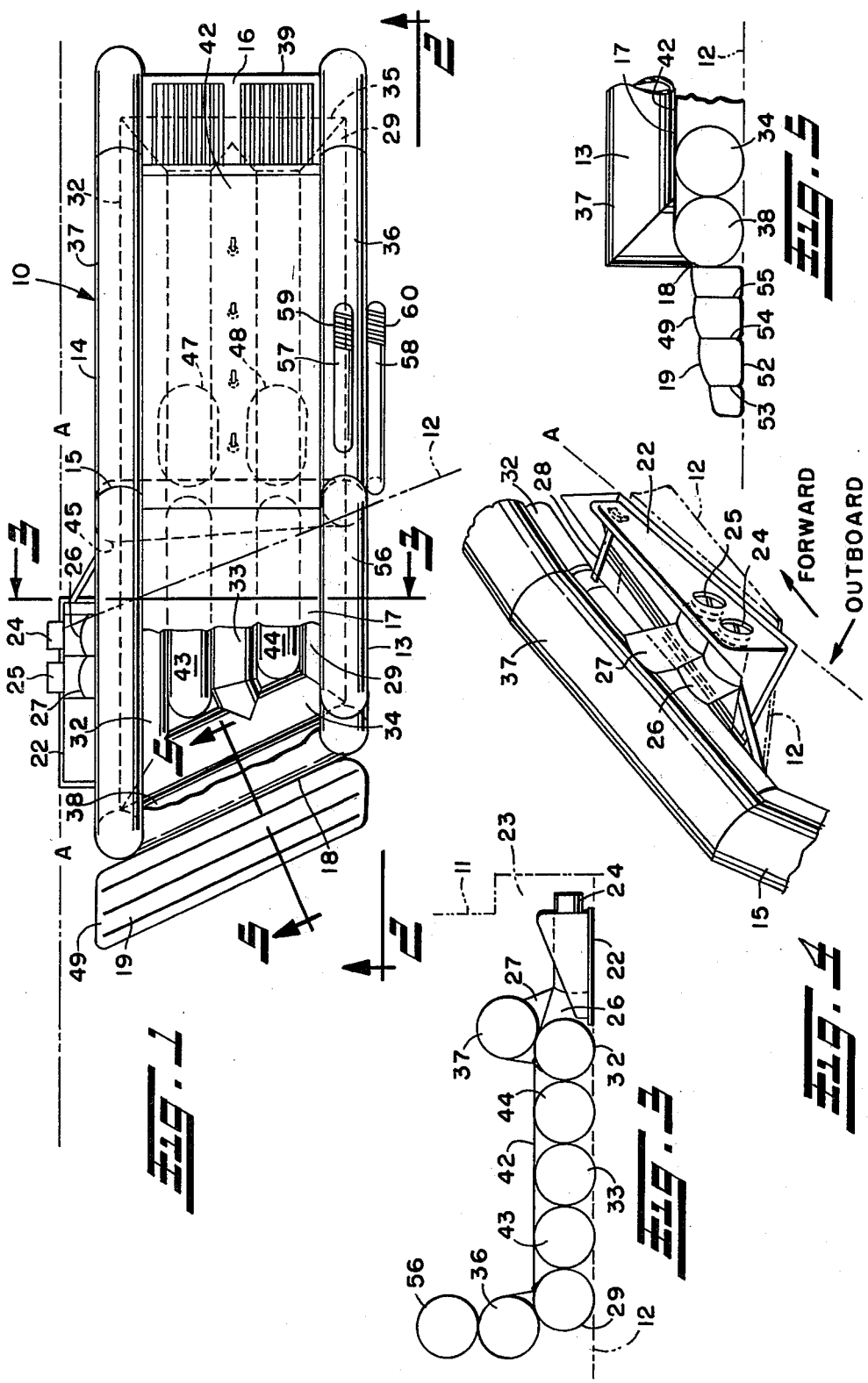

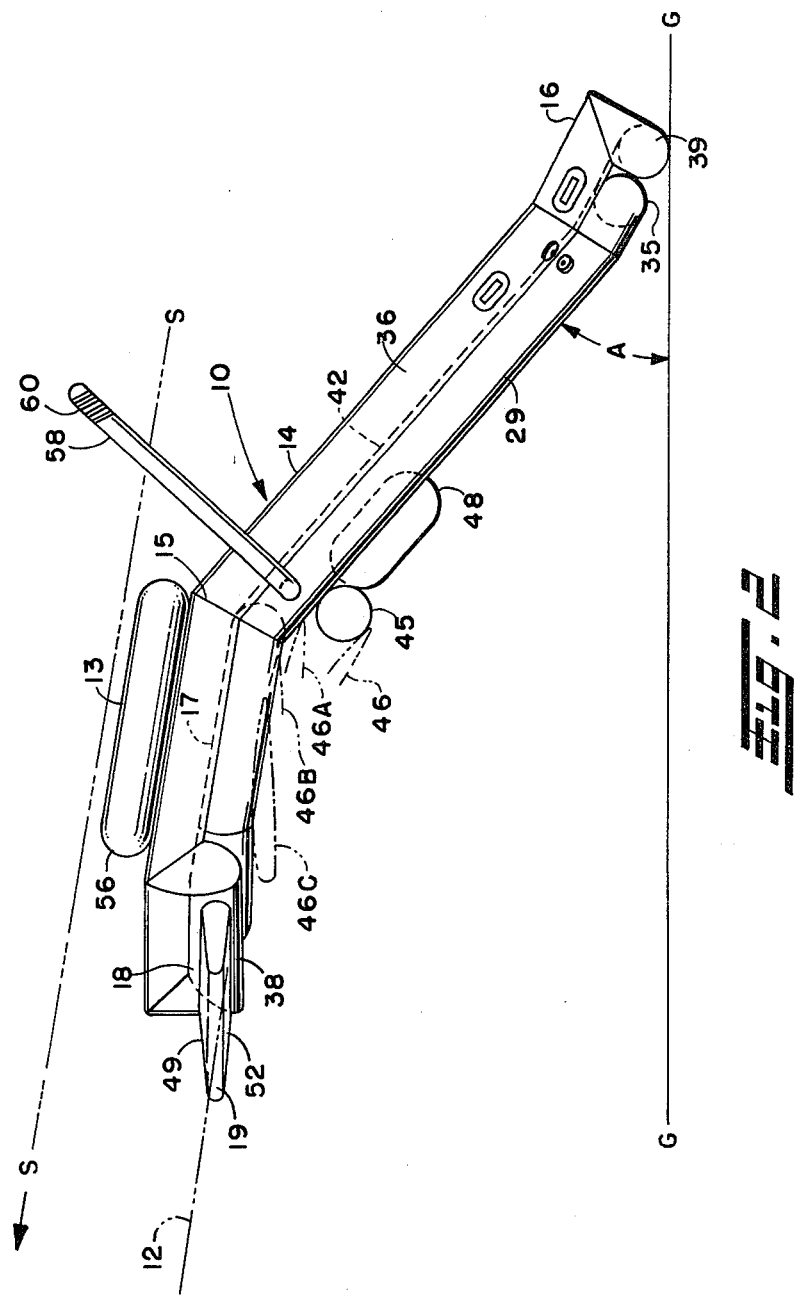

4,333,546

ESCAPE SLIDE

BACKGROUND OF THE INVENTION

This invention relates to an inflatable aircraft evacuation system and especially to an inflatable slide adapted to extend from a supporting surface such as an aircraft wing. This type of system requires the passengers to climb out on the wing surface and part of the slide before they reach the inclined surface of the slide. It is therefore important that the walking surface provide the necessary firmness and stability.

It is also important for the flight attendant to know whether or not the slide is properly extended without walking to the edge of the wing and looking down. This is important because the attendant must have this information without leaving the fuselage of the aircraft in order to direct the passengers to the escape slides which are operable.

Another requirement is to provide support of the wing mounted slide with the wing flap in the different operating positions of the wing flap so that the proper position of the slide will be maintained and especially if the evacuation is required with the flap set for landing.

SUMMARY OF THE INVENTION

According to an aspect of this invention, an escape slide is provided having an entrance ramp adaptable to rest on an inclined surface and being inflatable to provide the necessary rigidity of footing to support passengers entering and walking on the ramp.

Another aspect of this invention is to provide support for the slide by the wing flap at any position of the flap.

A further aspect of the invention is to provide a visible indicator which can be seen from the aircraft to indicate whether or not the slide is properly inflated and ready for use in evacuating passengers from the aircraft.

BRIEF DESCRIPTION OF THE DRAWINGS

In the drawings:

FIG. 1 is a partially schematic plan view of an inflatable escape slide assembly including walkway and slide mounted on an aircraft wing in the extended, inflated condition with the aircraft wing and fuselage being shown in dot-dash lines and parts being broken away to show the supporting tubes.

FIG. 2 is a side elevation taken along the plane of line 2—2 in FIG. 1 with the end of the flap at the outboard edge of the slide being shown in different operating positions.

FIG. 3 is a cross-sectional view taken along the plane of line 3—3 in FIG. 1.

FIG. 4 is a fragmentary schematic view in perspective showing the inflation tubes and inflation equipment for the assembly shown in FIG. 1.

FIG. 5 is a fragmentary cross-sectional view taken along the plane of line 5—5 in FIG. 1.

DETAILED DESCRIPTION

Referring to FIGS. 1 and 2, a multitubular inflatable escape slide 10 is shown in the inflated condition in position for evacuating passengers from an aircraft fuselage 11 on which an escape slide supporting surface such as aircraft wing 12 is mounted. The escape slide 10 has an inflatable relatively horizontal entrance portion 13 positioned on the wing 12 and an inclined inflatable slide portion 14 shown in position for evacuating passengers from the aircraft. The slide portion 14 is positioned at an angle A to the ground in the normal condition of the aircraft. The angle A of the slide portion 14 is about 43 degrees to the horizontal or ground line G—G. The slide portion 14 extends from an entrance end 15 adjacent the entrance portion 13 to an exit end 16 at the lower end of the slide which is supported by the ground surface at the ground line G—G.

The escape slide 10 has a walkway 17 extending from the entrance end 15 of the slide portion 14 to an edge 18 where the passengers enter the slide. A walkway ramp 19 may be fastened to the edge 18 for facilitating movement of the passengers from the wing 12 onto the escape slide 10. The escape slide 10 is fastened to the fuselage 11 through a packboard 22 which is pivotally mounted on the fuselage about an axis A—A for rotation of the packboard and the packaged escape slide 10 from a position within a compartment 23 in the wall of the fuselage 11 to a position on the wing 12 as shown in FIGS. 3, 4 and 5. In the extended position of the packboard 22, the escape slide 10 is inflated by a suitable inflation system such as turbofans 24 and 25 mounted on the packboard and connected to the escape slide by inflating conduits 26 and 27, respectively. The packboard 22 has a girt strap 28 for attachment to the escape slide 10 to hold it in position on the wing 22.

As shown in FIGS. 1, 2 and 3, the escape slide 10 has a multitubular construction including a left-hand lower side tube 29, a right-hand lower side tube 32, and a central main tube 33, all of which extend longitudinally of the escape slide through the entrance portion 13 and the slide portion 14. At the edge 18 of the entrance portion 13 and at the exit end 16 of the slide portion 14, the lower side tubes 29 and 32 are connected by an upper transverse tube 34 and a lower transverse tube 35.

The escape slide 10 also has a longitudinally extending left-hand upper side rail tube 36 mounted on top of the left-hand lower side tube 29 and a right-hand upper side rail tube 37 mounted on the right-hand lower side tube 32. The left-hand upper side rail tube 36 and right-hand upper side rail tube 37 are connected at the edge 18 of the entrance portion 13 by a U-shaped transverse upper tube 38 and by a U-shaped transverse lower tube 39 at the exit end 16 of the slide portion 14, both of which are mounted alongside the upper transverse tube 34 and lower transverse tube 35. A center panel 42 is fastened to the lower side tubes 29 and 32 and to the central main tube 33 between the upper side rail tubes 36 and 37 providing a slide surface in the slide portion 14 and a walking surface along the walkway 17.

The lower side tubes 29 and 32 are spaced from the central main tube 33 and in the entrance portion 13 these spaces are filled by walkway supporting tubes 43 and 44 extending from the upper transverse tube 34 to the entrance end 15 of the slide portion 14 providing a plurality of supporting tubes in side-by-side relationship under the walkway 17. These supporting tubes 29, 32, 33, 43 and 44 as well as the upper transverse tube 34 and U-shaped transverse upper tube 38 are located above a plane such as the plane of the wing 12 to provide a stable support for persons traversing the walkway 17 to the entrance end 15 of the slide portion 14. All of these supporting tubes are also positioned below the walkway 17 to provide unimpeded travel of the passengers over the walkway.

An inflatable support means such as pillow member 45 is mounted on the bottom of the slide portion 14 at the entrance end 15, as shown in FIGS. 1 and 2, in a position for engagement with a flap 46 of the wing 12 in an extended position such as the position taken during landing of the aircraft. In other positions of the flap, designated at 46A, 46B and 46C, the edge of the flap 46 engages the lower side of the escape slide 10 and provides support for the slide portion at the entrance end 15. Additional supporting means such as pillow members 47 and 48 may be mounted between the central main tube 33 and lower side tubes 29 and 32 for engagement with the pillow member 45 to provide further support of the escape slide in the slide portion 14.

The walkway ramp 19 is mounted on the U-shaped transverse upper tube 38 and has an upper surface 49 and a lower surface 52 connected by bulkheads 53, 54 and 55 forming transverse tubular spaces. As shown in FIG. 5, the upper surface 49 is inclined from the walkway 17 at the edge 18 of the entrance portion 13 so as to facilitate walking of the passengers from the surface of the wing 12 to the walkway. The bulkheads 54 and 55 in close proximity to the edge 18 of the entrance portion 13 have a greater length than the bulkhead 53 at a position remote from the edge so that upon inflation of the ramp 19, the upper surface 49 will have the desired inclination. The ramp 19 is mounted on and connected to the U-shaped transverse upper tube 38.

A top side rail 56 may be mounted on top the left-hand upper side rail tube 36, as shown in FIGS. 1, 2 and 3.

The turbofan 24 and conduit 26 are connected to the lower side tubes 29,32, the central main tube 33, the walkway supporting tubes 43, 44 and pillow members 45, 47 and 48 in a first inflation system. The turbofan 25 and conduit 27 are connected to upper rail tubes 36,37, U-shaped transverse tubes 38 and 39, walkway ramp 19 and top side rail tube 56 in a second inflation system. With the two independent systems, the slide 10 may still be usable if one of the systems is inoperable.

To indicate the inflation of the inflation systems and therefore the extension of the escape slide 10 and particularly the slide portion 14, inflatable indicator tubes 57 and 58 are mounted on the left-hand lower side tube 29 and left-hand upper side rail tube 36, respectively. Upon inflation of the lower and upper inflatable systems, the indicator tubes 57 and 58 will be inflated and extend upwardly beyond a line of sight S—S, shown in chain-dotted lines in FIG. 2, of a flight attendant from the fuselage access door. The attendant can thereby tell by looking from within the fuselage whether the slide portion 14 is inflated and extended so as to evacuate the passengers safely from the aircraft. If either the lower inflatable system or upper inflatable system is damaged and not inflated, the appropriate indicator tubes 57 or 58 will not be inflated and this will be evident from inside the fuselage 11. The indicator tubes 57 and 58 have a sufficient diameter to provide rigidity and extend above the line of sight S—S while at the same time they have a diameter which is small enough to require a minimum of inflatable gas. Marking tape 59 and 60, which may be of a highly visible material, may be wrapped around the ends of the indicator tubes 57 and 58 to make them more visible to the aircraft attendant.

In operation, the packboard 22 may be extended and the escape slide 10 inflated by suitable controls from within the fuselage 11. The attendant then can look out the access door of the fuselage 11 and by observing the positions of the indicator tubes 57 and 58 determine if the slide portion 14, which is not visible from the fuselage, is in condition for evacuating passengers. The passengers may then walk on the surface of the wing 12 up the ramp 19 and over walkway 17 to the entrance end 15 of the slide portion 14. They may then slide on the center panel 42 from the entrance end to the exit end 16 of the slide portion.

The turbofans 24 and 25 inflate the upper and lower inflation systems of the escape slide 10 in about two seconds inflation time to a pressure of about three pounds per square inch (0.21 kilograms per square centimeter). The escape slide 10 may be constructed of a suitable flexible material such as square-woven nylon impregnated with neoprene to retain air or other inflation medium in the inflatable parts.

It is understood that this invention is capable of other modifications and adaptions by those having ordinary skill in the art and is more particularly defined by the appended claims.

I claim:

1. An escape slide adapted to be inflated and extend from a supporting surface at an elevated position to a lower surface comprising an inflatable entrance portion with a walkway for mounting on said supporting surface and a slide portion extending from an entrance end at said elevated position to an exit end at said lower surface, said entrance portion of said escape slide including a plurality of supporting tubes having top and bottom surfaces, at least some of said bottom surfaces of said supporting tubes being in the same plane for engagement with said supporting surface, at least some of said top surfaces of said supporting tubes providing support for said walkway and all of said supporting tubes being located above said plane of said bottom surfaces and below said walkway to provide a stable support for persons traversing said walkway to said entrance end of said slide portion, and an inflatable, substantially rigid walkway ramp having an upper surface and a lower surface extending outwardly from an edge of said entrance portion.

2. An escape slide in accordance with claim 1 wherein said walkway ramp has supporting tubes formed by bulkheads extending between said upper surface and said lower surface of said ramp and said bulkheads in close proximity to said edge having a greater length than other of said bulkheads remote from said edge so that said upper surface of said ramp is inclined from said supporting surface to said edge.

3. An escape slide adapted to be inflated and extend from a supporting surface at an elevated position to a lower surface comprising an inflatable entrance portion with a walkway for mounting on said supporting surface and a slide portion extending from an entrance end at said elevated position to an exit end at said lower surface, said entrance portion of said escape slide including a plurality of supporting tubes having top and bottom surfaces, at least some of said bottom surfaces of said supporting tubes being in the same plane for engagement with said supporting surface, at least some of said top surfaces of said supporting tubes providing support for said walkway and all of said supporting tubes being located above said plane of said bottom surfaces and below said walkway to provide a stable support for persons traversing said walkway to said entrance end of said slide portion and wherein said slide portion has an inflatable indicator tube attached to and in communication with said slide portion for indicating inflation of said slide portion upon inflation and extension of said escape slide.

4. An escape slide in accordance with claim 3 wherein said slide portion has an inflatable side tube extending longitudinally of said slide portion from said entrance end to said exit end and said inflatable indicator tube is attached to and in communication with said side tube for indicating inflation of said side tube upon inflation and extension of said escape slide.

5. An escape slide in accordance with claim 3 wherein said slide portion has an inflatable side rail tube extending longitudinally of said slide portion from said entrance end to said exit end and said inflatable indicator tube is attached to and in communication with said side rail tube for indicating inflation of said side rail tube upon inflation and extension of said escape slide.

6. An escape slide in accordance with claim 4 wherein said slide portion has an inflatable side rail tube mounted on said side tube and an inflatable side rail indicator tube attached to and in communication with said side rail tube for indicating inflation and said side rail tube upon inflation and extension of said escape slide.

7. An escape slide adapted to be inflated and extend from a supporting surface at an elevated position to a lower surface comprising an inflatable entrance portion with a walkway for mounting on said supporting surface and a slide portion extending from an entrance end at said elevated position to an exit end at said lower surface, said entrance portion of said escape slide including a plurality of supporting tubes having top and bottom surfaces, at least some of said bottom surfaces of said supporting tubes being in the same plane for engagement with said supporting surface, at least some of said top surfaces of said supporting tubes providing support for said walkway and all of said supporting tubes being located above said plane of said bottom surfaces and below said walkway to provide a stable support for persons traversing said walkway to said entrance end of said slide portion wherein said supporting surface is an aircraft wing having a flap movable to different positions during differing operating conditions, said slide portion having an inflatable support means attached to the bottom of said slide portion and said flap being engageable with the bottom of said slide portion in certain operating positions of said flap and being engageable with said inflatable support means in other operating positions of said flap to support said escape slide in an inclined position for evacuation of passengers from the aircraft, and wherein said supporting means includes a second inflatable support means the bottom of said slide portion at a position adjacent said first-mentioned support means and toward said exit end of said slide portion from said first-mentioned support means for engagement of said second support means by said first-mentioned support means upon engagement of said first-mentioned support means with said flap in said certain operating positions of said flap.

8. An escape slide in accordance with claim 7 wherein said first-mentioned support means extends across said slide portion and said second support means includes two spaced-apart inflatable pillow members attached to and in communication with said slide member.

* * * * *